US008793571B1

(12) United States Patent
Warner, Jr.

(10) Patent No.: US 8,793,571 B1
(45) Date of Patent: Jul. 29, 2014

(54) SYSTEM AND METHOD FOR REPEAT VIEWING COMPONENTS OF DIGITAL DOCUMENTS AND DETERMINING VIEWER CONTEXT

(75) Inventor: James A. Warner, Jr., Sudbury, MA (US)

(73) Assignee: Documensions, Inc., Sudbury, MA (US)

( * ) Notice: Subject to any disclaimer, the term of this patent is extended or adjusted under 35 U.S.C. 154(b) by 174 days.

(21) Appl. No.: 13/004,424

(22) Filed: Jan. 11, 2011

Related U.S. Application Data

(60) Provisional application No. 61/293,792, filed on Jan. 11, 2010.

(51) Int. Cl.
*G06F 17/00* (2006.01)
(52) U.S. Cl.
USPC ............................ 715/246; 715/243; 715/255
(58) Field of Classification Search
USPC ......... 715/200, 201, 203, 234, 243, 246, 255, 715/272
See application file for complete search history.

(56) References Cited

U.S. PATENT DOCUMENTS

| | | | | |
|---|---|---|---|---|
| 5,812,131 | A * | 9/1998 | Bertram ........................ | 715/798 |
| 7,032,181 | B1 * | 4/2006 | Farcasiu ........................ | 715/764 |
| 2005/0022116 | A1 | 1/2005 | Bowman et al. | |
| 2005/0210384 | A1 * | 9/2005 | Klassen et al. ................ | 715/534 |
| 2006/0031256 | A1 * | 2/2006 | Bosworth et al. .......... | 707/104.1 |
| 2006/0236238 | A1 * | 10/2006 | Yoshikawa .................... | 715/530 |
| 2008/0071857 | A1 * | 3/2008 | Lie ................................. | 709/203 |
| 2008/0092039 | A1 * | 4/2008 | Brockway et al. ............ | 715/246 |
| 2008/0092071 | A1 * | 4/2008 | Chiu ............................ | 715/764 |
| 2008/0115057 | A1 * | 5/2008 | Grandhi et al. ............... | 715/272 |
| 2009/0288019 | A1 * | 11/2009 | Tunning ........................ | 715/760 |

OTHER PUBLICATIONS

"Document Object Model (DOM) Level 1 Specification", version 1.0, Oct. 1, 1998, 169 pages.
Ducklin, P., "Google announces brand new web browser core, so does Mozilla," Apr. 4, 2013, 5 pages.
Document Object Model, Retrieved from http://en.wikipedia.org/wiki/Document_Object_Model, last modified Nov. 5, 2009, 4 pages.
Segan, Sasha, for Skyfire's Mobile Web, The Secret's in the Server, PC Magazine Digital Edition, Jan. 29, 2008, 4 pages.
Sullivan, Laurie, Monster.com Tests BT Technology for Educators, retrieved from the Internet MediaPost Publication news@mediapost.com, Nov. 25, 2009, 1 page.
Artail, Hassan A. and Raydan, Mackram, Device-aware desktop web page transformation for rendering on handhelds, Pers Ubiquit Comput (2005) 9: pp. 368-380, published online: Sep. 27, 2005, Springer-Verlag London Limited 2005.
Render—definition of render by the Free Online Dictionary, Thesaurus and Excyclopedia, www.thefreedictionary.com, download from Internet on Jul. 1, 2013, 7 pages.

* cited by examiner

*Primary Examiner* — Stephen Hong
*Assistant Examiner* — Gregory J Vaughn
(74) *Attorney, Agent, or Firm* — Cesari and McKenna, LLP

(57) ABSTRACT

A method and system for identifying individual component objects of a digital document and storing and retrieving such data for repeated discovery and viewing. Pages of digital documents are retrieved from servers and desired objects are displayed on a client computer. The human viewer's context is deduced from attributes of the object to determine further processing, including mobile advertising display.

22 Claims, 16 Drawing Sheets

Naming

HTML code of the component in the source page code

```
<html><body bgColor="#ffffff link=#000099 topMargin=0 vlink=#000099 topMargin="0"
marginwidth="10" marginheight="0">
<table width="860" border="0" cellspacing="3" cellpadding="0">
<tr><td colspan="2" height="1"></td></tr>
<tr><td valign="top" align="left" width="550">
<table border="1" bordercolor="#666699" width="550" cellpadding="2"
cellspacing="0"
style="BORDER-COLLAPSE: collapse; border: #666699 2px solid;">
<!-- U.S. Gasoline and Diesel Fuel Prices -->
<tr>
<th align="middle" colspan="8" bgcolor="#D3E1FA">
    <font color="#000000" face="Arial, Helvetica, sans-serif" size="2">
    <b>U.S. Gasoline and Diesel Fuel Prices, 12/28/09</b>
    </font>
</th>
</tr>
<tr>
<td colspan="4" width="275" height="190" bgcolor="#ffffff" align="center">
    <img src="grprrets.gif" align="middle" width="235" height="185" border="0"
    title="U.S. Regular Gasoline Prices Graph.">                                250
</td>
<td colspan="4" width="275" height="190" bgcolor="#ffffff" align="center">
    <IMG src="dlprrets.gif" align="middle" width="235" height="185" border=0
    title="U.S. On-Highway Diesel Fuel Prices Graph.">
</td>
</tr>
....
</html>
```

FIG. 2A

HTML code of the IMG component

```
<td colspan="4" width="275" height="190" bgcolor="#ffffff" align="center">
    <img src="grprrets.gif" align="middle" width="235" height="185" border="0"
         title="U.S. Regular Gasoline Prices Graph.">
</td>
```
250

IMG object as displayed on screen

50

File format  Component Locator Description File

<!-- comments e.g., List | Display name | URL -->
<HTML><!-- comments e.g., List | Display name | URL -->
<HEAD>(optional static styles)</HEAD>
<BODY (optional onLoad command for directed function execution)>
  <Selected element tagName
  ID='(ID assigned on composition)'
  SRC='(SRC of element if selected element is an IMAGE)'
  TITLE='(optional static TITLE instead of source page TITLE)'
  REF='(refresh element – true|false)'
  DOMAIN='(domainName of the URL)'
  PUBNAME='(brand name of publisher of source page)'
  STYLE='(positioning type, upper left corner location, width, height)'
  ORD='(sequential order number of the selected element of all the elements of the page)'
  TAGORD='(sequential order number of the selected element of all of the same tagName)'
  PARENTID='(ID of selected element's parent)'
  PARENTTAG='(tagName of the selected element's parent)'
  PARENTTAGORD='(the TAGORD for the selected element's parent)'

FIG. 2D

File format    Component Locator Description File

BEGPEERIDX='(ordinal index of the first element which is a peer of the selected element having the same parent)'
PEERSIBIDX='(the ordinal index of the selected element)'
PEERSIBCNT='(the number of peers with the same tagName and the same parent element)'
PGSRC='(URL of the source page)'
SRCCLASS='(className applied to the selected element)'
SRCCLASSORD='(ordinal sequence of elements using the SRCCLASS)'
DIMH='(height style if selected element is measurable)'
FONTSIZE='(fontSize style if selected element is a DIV)'
COLS='(number of columns is selected element is a TABLE)'
SRCID='(the ID of the selected element on the source page)'
SRCTAG='(the tagName of the selected element)'
BY='(composer ID)'
AT='(time/datestamp when composed)'
META='(meta KEYWORDS of the source page)'
>
</BODY></HTML>

FIG. 2E

Example Component Locator Description File

```
<html>
<!--
Finance|GasolinePrice|http://tonto.eia.doe.gov/oog/info/gdu/gasdiesel.asp
-->
<head></head>
<body>
<IMG ID='IMG1' SRC='http://tonto.eia.doe.gov/oog/info/gdu/grprrets.gif'
TITLE=''
STYLE='position:absolute;left:0px;top:0px;
z-index:1;width:235px;height:185px;'
ORD='' REF='false' TAGORD='5' PARENTTAG='' BEGPEERIDX='' PEERSIBIDX=''
PEERSIBCNT=''
PGSRC='http://tonto.eia.doe.gov/oog/info/gdu/gasdiesel.asp'
PARENTID='' PARENTELEMID='' PARENTTAGORD='' SRCCLASS='' SRCCLASSORD=''
DIMH='185' FONTSIZE='' COLS='' SRCID='' SRCTAG='IMG'
BY='jwarner@clicksheet.com' AT='' >
</body></html>
```

FIG. 2F

SYSTEM AND METHOD FOR REPEAT VIEWING COMPONENTS OF DIGITAL DOCUMENTS AND DETERMINING VIEWER CONTEXT

CROSS REFERENCE TO RELATED APPLICATION(S)

This application claims the benefit of a prior U.S. Provisional Patent Application Ser. No. 61/293,792 filed on Jan. 11, 2010 entitled "System and Method for Repeat Viewing Components of Digital Documents and Determining Viewer Context", the entire contents of which are hereby incorporated by reference.

BACKGROUND

Digital documents based on markup languages have come to embody a major portion of human communication. Specifically, web pages, based on the HTML markup language, have become widely accessible by people using client computers running web browser software that are connected to the Internet. Such client computers now include small devices running on battery power that are capable of communicating wirelessly over both short (feet) and long (several miles) distances. These and other advancements enable these mobile devices to download and view web pages away from any supporting infrastructure. When these client computers have the capability of executing the runtime core of web browser software, they can also execute programming that may be embedded in such pages including those known as "apps".

Mobile web-capable devices typically have small screens to make them more easily transportable. But the standard web page is sized for viewing on desktop client computers with large screens. Even individual components of a web page, such as tables, images and text blocks may be larger than the small screen can display. Mobile devices typically also have keystroke input capabilities that are inferior to a desktop client with a keyboard. In addition, mobile devices are often used in a setting which makes both screen viewing and input even more difficult. Finally, cost savings and performance improvements may be achievable if only the specific component or a subset of all the components of the page are required to be downloaded. These drawbacks necessitate greater effort and possibly longer delays and greater costs for the viewer to retrieve web pages and to view particular components of information on a page that interest them. These drawbacks also pertain to larger screen devices, such as tablets, netbooks, laptops and PCs, to varying degrees.

Techniques have been devised which attempt to ameliorate this barrier to information access. For example, bookmarks in browser software can be set when visiting a web page to speed repeat access to it in the future. Touch-sensitive screens with software that can interpret physical gestures can improve page scrolling. Transcoding servers re-write the markup language of standard web pages to deliver modified pages with resized component information objects that fit mobile screens better. These techniques reduce barriers for users of certain mobile devices or the publishers of certain web-based information. But they do not provide a general solution that enables faster, better, and possibly less costly viewing of the information objects from the documents of most all web servers.

Small screens and the personal nature of mobile communications have resulted in viewer resistance to advertising display on their devices. Advertisers have found that sponsoring searches on online desktop personal computers using a search engine service has been commercially effective because search terms indicate the viewer's contextual intent. Presently, advertisers have limited means of displaying advertisements on mobile devices that are more contextually precise and more of a navigational aid than an intrusion. Furthermore, viewers are becoming more resistant to privacy invasion that results from tracking viewing history and associating it with personal information. Advertisers need ways to display advertising that is at least as effective as that placed on search results pages especially if personal information is not available to them.

SUMMARY

This summary is provided to introduce a selection of concepts in a simplified form that are further described below in the Detailed Description. This Summary is not intended to identify key features or essential features of the claimed subject matter, nor is it intended to identify key features or essential features of the claimed subject matter, nor is it intended to be used as an aid in determining the scope of the claimed subject matter. It is intended that only the Clams which follow define the scope of legal protection sought herein.

Embodiments of the present disclosure pertain to a method and system for viewing information objects which are components of digital documents based on markup languages like HTML and for deducing the viewer's context. First, a document is downloaded from a server. A component information object of the document is selected, given a name and assigned to an organizing group. Certain attributes of the component are collected and stored. When a viewer wishes to display the component at some later time, its attribute data is used to locate the source document and download components of it. The document object model (DOM) of the source document is used in conjunction with the stored attribute data to locate the desired component and display the current data it contains. The viewer's context, as represented by the attributes and content of the displayed object, is transmitted to remote servers for further processing, including possibly display of additional content.

BRIEF DESCRIPTION OF THE DRAWINGS

The accompanying drawings, which are incorporated in and form a part of this specification, illustrate one or more example embodiments of the invention as recited in the Claims that follow and, together with the description, serve to explain the principles of those embodiments:

FIGS. 2A and 2B show the HTML code of an example source page and its appearance as displayed by a web browser with the HTML code of the selected component highlighted. FIGS. 2D and 2E show the format of the Component Locator Description File. FIG. 2F shows an example component locator description file.

Figure 1A:
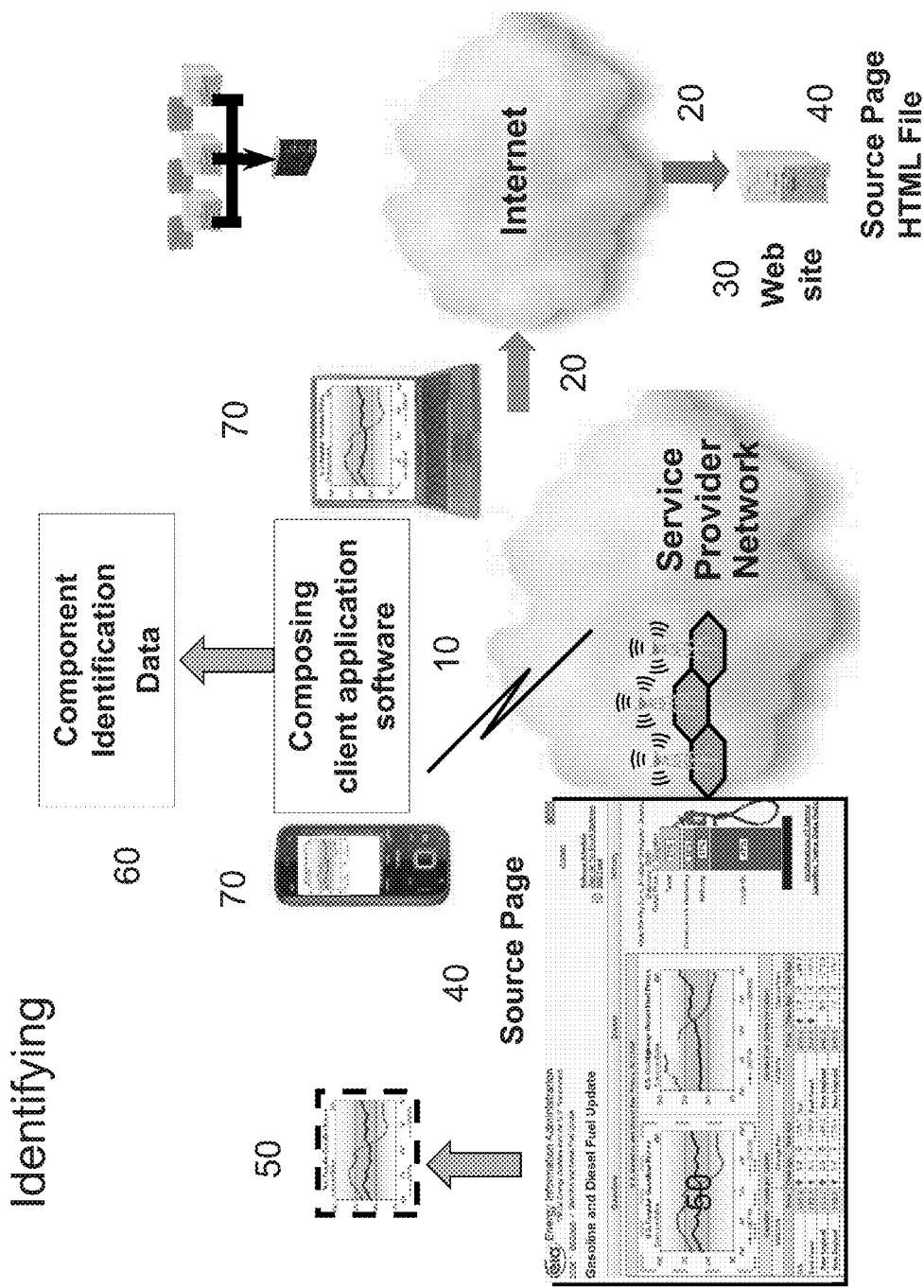
FIGS. 1A, 1B and 1C show diagrams and screen shots of the system for identifying the desired component object, naming it, and saving its identification data.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF EXAMPLE EMBODIMENTS

A description of example embodiments of the invention follows.

A method and system for repeat dynamic viewing of components of digital documents and deducing viewer context from a component's attributes and content is disclosed. Abundant information useful to viewers is contained in web pages now accessible by mobile and other devices that are capable of executing the runtime code of web browser software. But screens may be too small for easily viewing individual components that may be located anywhere on the page. Regardless of screen size, performance improvements and possibly cost savings may come from retrieving only the component of interest or a subset of the components of the full web page. Publishers that use transcoding servers to re-format web pages must bear the expense of installing and operating them, accept compromises in the appearance of their content that such servers cause, and suffer additional delivery costs and lower quality delivery to their viewers. Advertisers cannot overcome the resistance of the mobile device user to the intrusion of ads without delivering more contextually relevant advertising and soliciting some measure of viewer "opt-in". Yet viewers are becoming more resistant to perceived invasions of their personal privacy as a result of tracking of their usage behavior. Embodiments of the present disclosure overcome these limitations by using the structure of a web page standardized in the Document Object Model, which is implemented in web browser software, to identify a desired component dynamically and to display it using the HTML and associated code that governs its layout, appearance and contents. Embodiments of the present disclosure enable the delivery of less intrusive and more contextually relevant advertising by deducing the context of the specific component being displayed from its attributes and content and by providing a mechanism for the viewer to choose to view more advertising content with little effort.

Referring now to FIG. 1A, this shows a diagram of the system for identifying a component object of a digital document that can be viewed dynamically multiple times in the future. Such component may have content that is static or volatile. A user with a client computer or mobile device that is running the composing client application software 10 connects to the Internet 20 either through an Internet Service provider or through a wireless service provider. When the user first visits a web site 30, the composing client application software utilizes web browser facilities to request a web document 40 and downloads its HTML and related defining code. The composing client application provides an interface that visually indicates to the user those components of the document that qualify for individual display. Such components may have HTML tag names such as TABLE, IMG, DIV, etc. When the user selects an element 50, the client software collects certain attributes that make up the component identification data 60. The selected component is displayed 70 on the client device screen.

The component identification data contains at least the minimum information required by the display client application software to locate the particular component in a particular source document at a later time so that it can be redisplayed with updated contents. This data includes the URL of the source document that includes the component. It also includes data which identify the component, such as its ID, if it has one, its tag name, or element type, the ordinal position within the collection of peer elements having the same tag name, and other attributes which attempt to resolve ambiguities in case, for example, the component has been moved on the page from its original position.

Figure 1B:
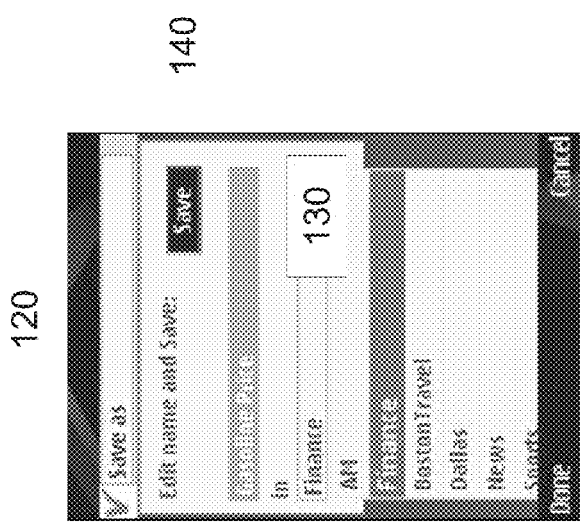
Figure 1B:
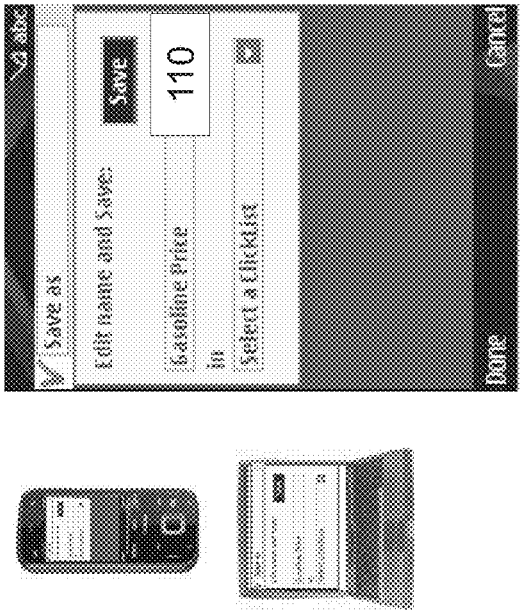

FIG. 1B shows screen shots of the application software 100 and 120 during the naming of the component object for future reference 110 and the assignment of it to an organizing group 130. This data along with the component identification data 60 makes up the component locator description data 150 that is saved when the user presses the Save button 140.

Figure 1C:
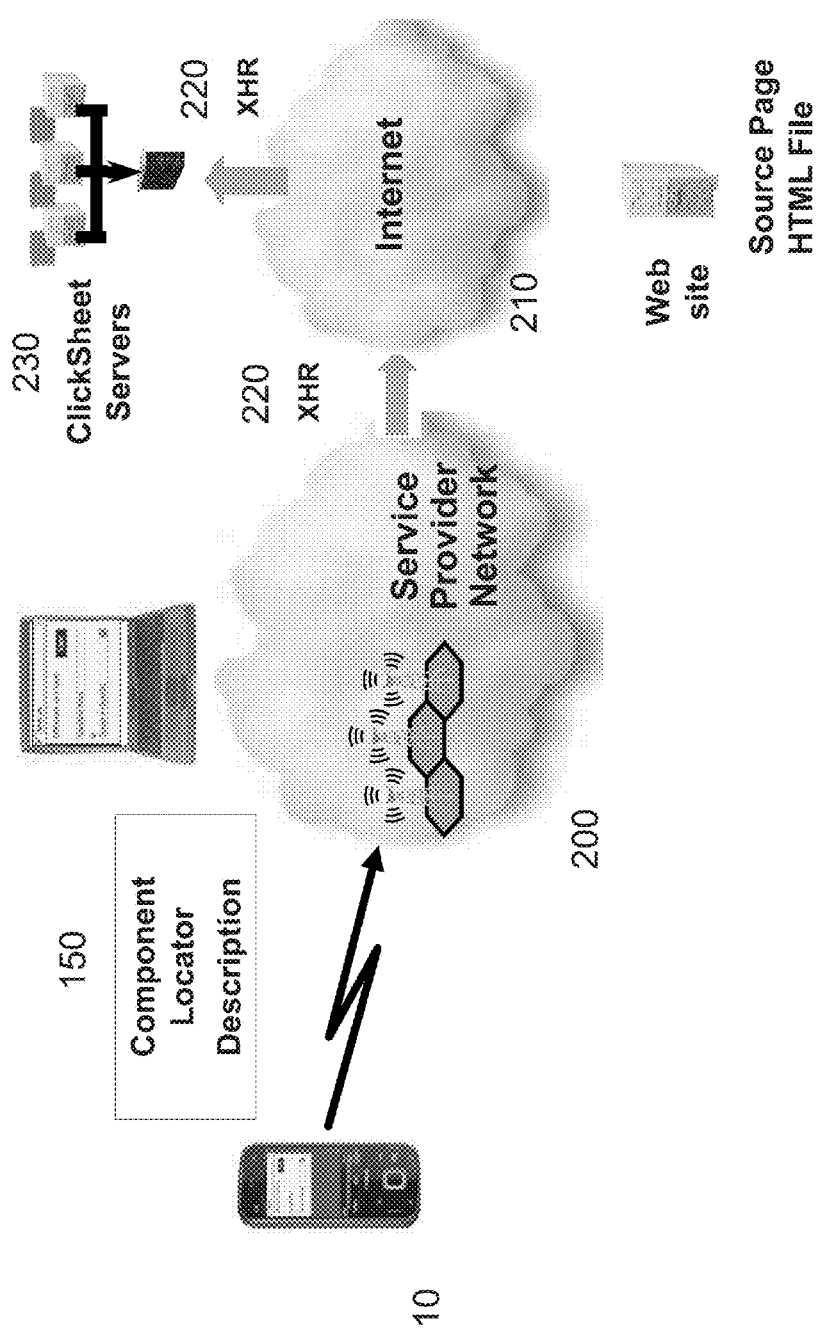

FIG. 1C shows a diagram of one system for saving the element locator description data through Internet connections 210 using the XmlHttpRequest protocol 220 to a remote server 230. While the component locator description data can be saved to the local device which originated it, saving it remotely enables the originating user to access the content from other client devices, possibly with different capabilities or in different locations, to ensure access in case the originating device fails or is lost, and it enables other users to display the same content on various other client devices if they have been given access.

Figure 2B:
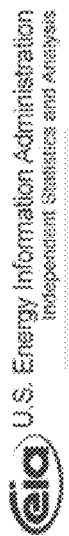
Figure 2B:
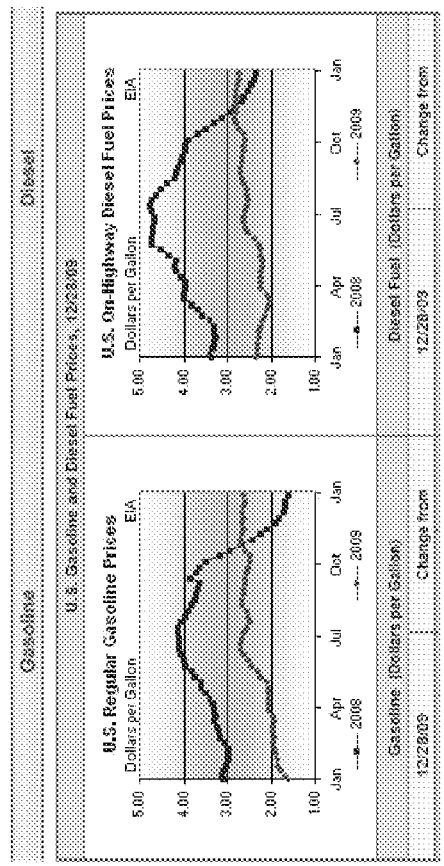
Figure 2C:
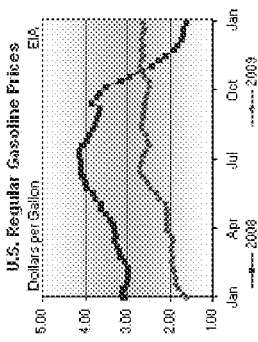
FIG. 2C shows the component HTML code isolated from the source page and its appearance as displayed by a browser.

FIG. 2A shows the abbreviated and simplified HTML source code of a part of an example web page. The box 250 outlines the HTML code for a specific component of the document which has an IMG tag name. FIG. 2B shows a screen shot of part of the source page 40 that the page's HTML code defines. FIG. 2C shows the defining source code of the IMG element highlighted in the box 250 along with a screen shot of the element as displayed by such source code 50. The composing client application software uses the Document Object Model of the source page constructed by the web browser software to collect attributes from the source code of both the page and the individual element to assemble the component identification data.

The component locator description data can be stored in a format shown in FIGS. 2D, 2E and 2F as an HTML or XML file for direct delivery to, and ready processing by, the client browser. Or it can be stored in a database of items that can be re-ordered, compressed, or otherwise modified for performance or security improvements so long as the data can be assembled and supplied to the display client application software in a usable form.

The presentation attributes and user-provided data that are stored in the example HTML component locator description file may include some or all of the following:

LIST—the organizing group
DISPLAY NAME—the name given the component for viewing
ID—an assigned unique id used with multiple components
SRC—the src of the component if it is an IMG
DOMAIN—the domain name of the publisher's web site
PUBNAME—the publisher's brand name
STYLE—positioning styles
ORD—the sequential number of the component of all on the page TAGORD—the sequential number of the component of its peers
PARENTID—the id of the component's parent element
PARENTTAG—the tag name of the component's parent element
PARENTTAGORD—the TAGORD of the parent element
BEGPEERIDX—the index of the first peer with the same parent
PEERSIBIDX—the index of the component within its peers
PEERSIBCNT—the number of peer elements
PGSRC—the URL of the source page
SRCCLASS—the className of the component
SRCCLASSORD—the sequential number this class instance
DIMH—the height style of the component
FONTSIZE—the font size of the component
COLS—the number of columns if the component is a TABLE
SRCID—the id of the component if there is one
SRCTAG—the tagName of the component
BY—the unique id of the composer
AT—the time and date composed
METAPG—meta KEYWORDS of the source page
METASRC—description provided by composer or others
The order of the entries is not determinative. Additional attributes may be utilized to improve retrieval performance.

Figure 3:
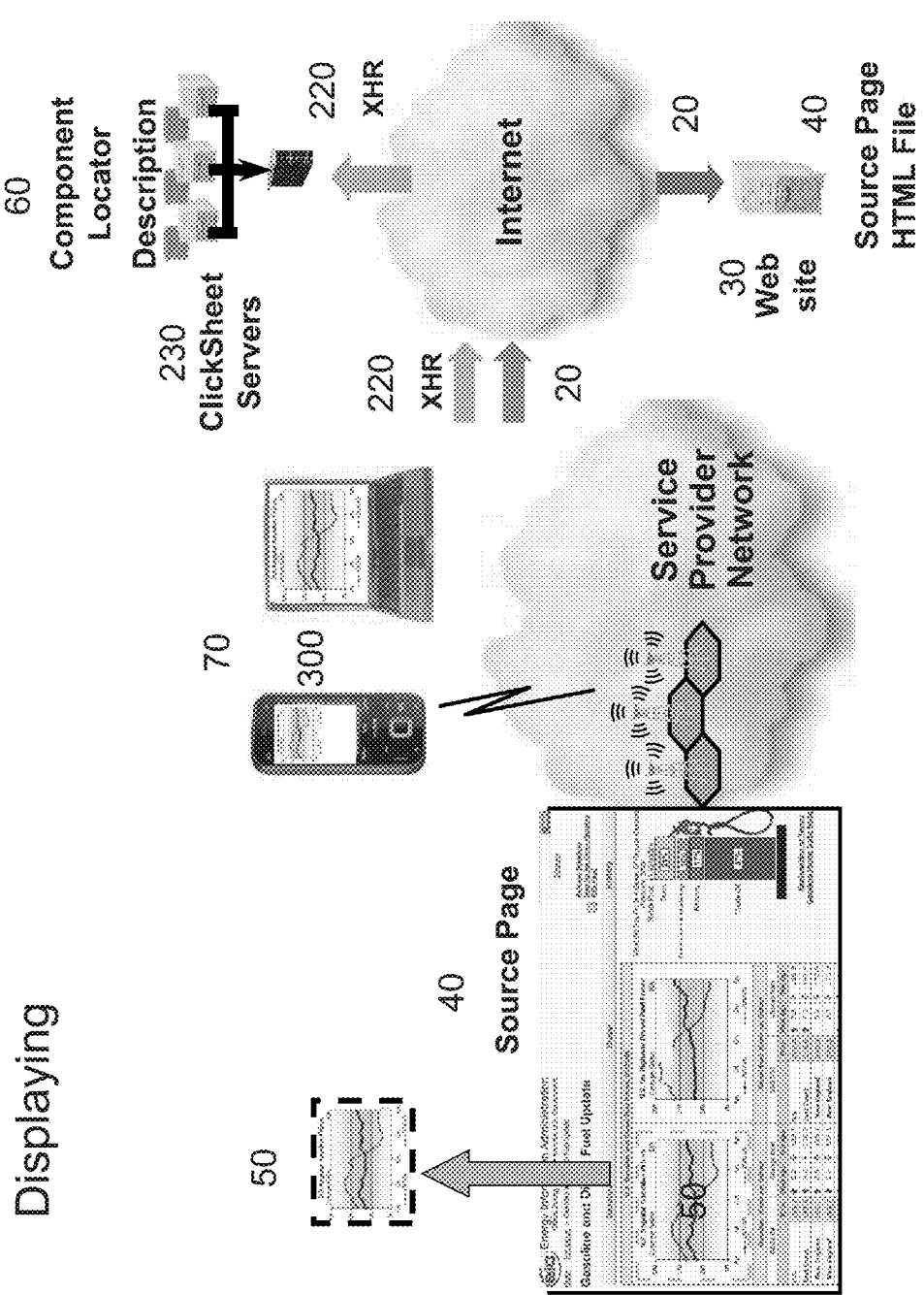
FIG. 3 shows a diagram of the system for displaying the component object.

FIG. 3 shows a diagram of a system for displaying a component object of a digital document. The user of a client computer or mobile device that is running the display client application software 300 connects to the Internet either through an Internet Service provider or through a wireless service provider. The client application uses the XmlHttpRequest protocol 220 to connect to a remote server 230 and requests the component locator description data for the desired component object 50. This data is downloaded and the client application software uses it to establish an HTTP connection 20 to the appropriate source document web server 30. The HTML file 40 of the source document of the desired component object is downloaded to the memory of the client computer or mobile device. Next the client application applies its algorithms to the component locator description data and the source code of the source document to identify the desired component object 50. The client application then displays the desired component object, using its defining source code and other attribute information as it is currently displayed on the source document web server, on the screen of the client computer or mobile device 70.

Figure 4:
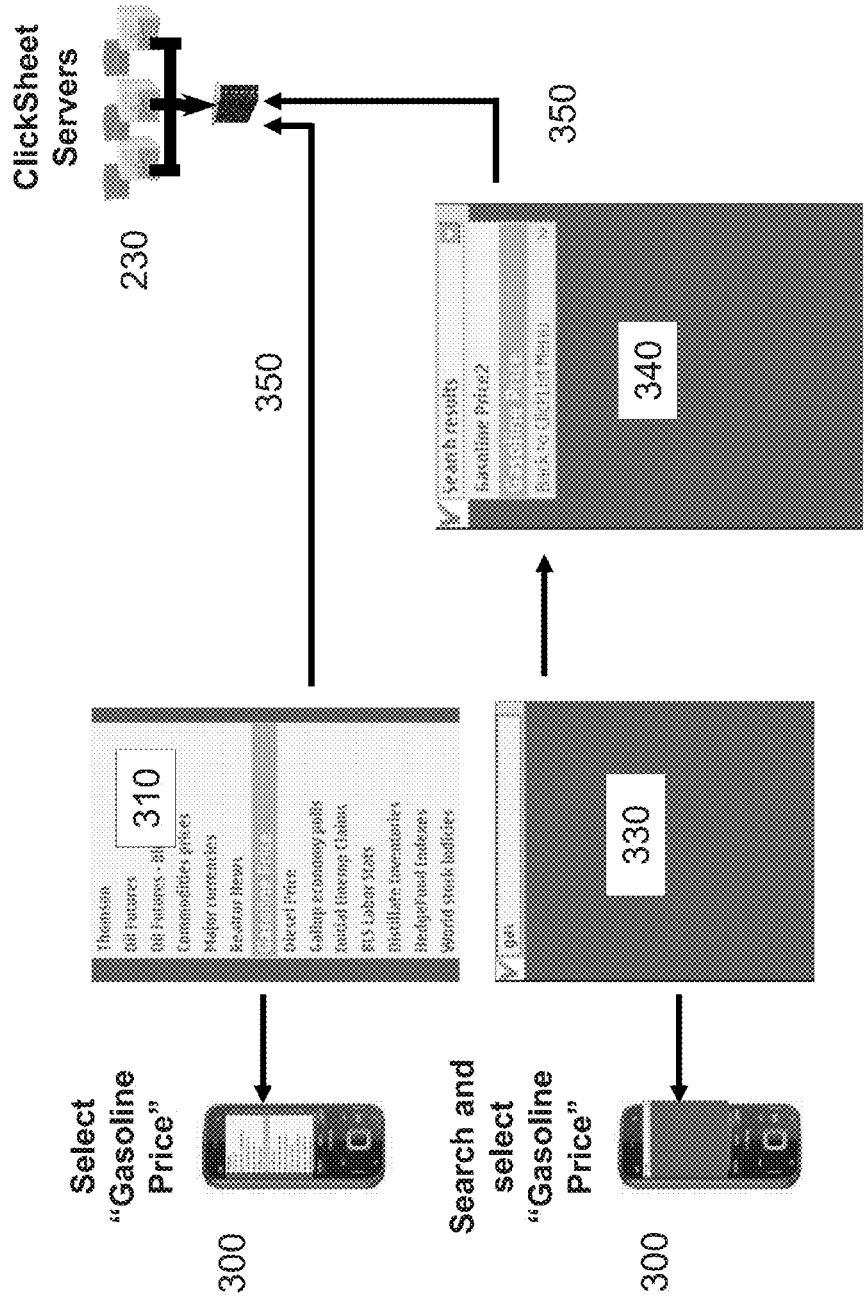
FIG. 4 shows screen shots of context detection.

When the user selects a component object by the name given it at the time of identification, or any other term incorporating textual attributes, the user is instantiating a context with that term the same as if the user had input a search term into a search engine. FIG. 4 shows screen shots of the client application selecting a context term, such as the component object's name, either from a list 310 and then transmitting the request 350 to a remote server 230 or by searching the user's available collection of component objects with some search term 330, selecting a context term from a results list 340 and then transmitting the request 350 to a remote server 230. The context term sent to the server may include additional attributes of the component object such as the domain name, title and metatags of the source page, content of the component (such as text), and attributes of the component, its neighbors or the page. Furthermore, the context term can include usage attributes such as location, time of day, and motion of the mobile device.

Figure 5:
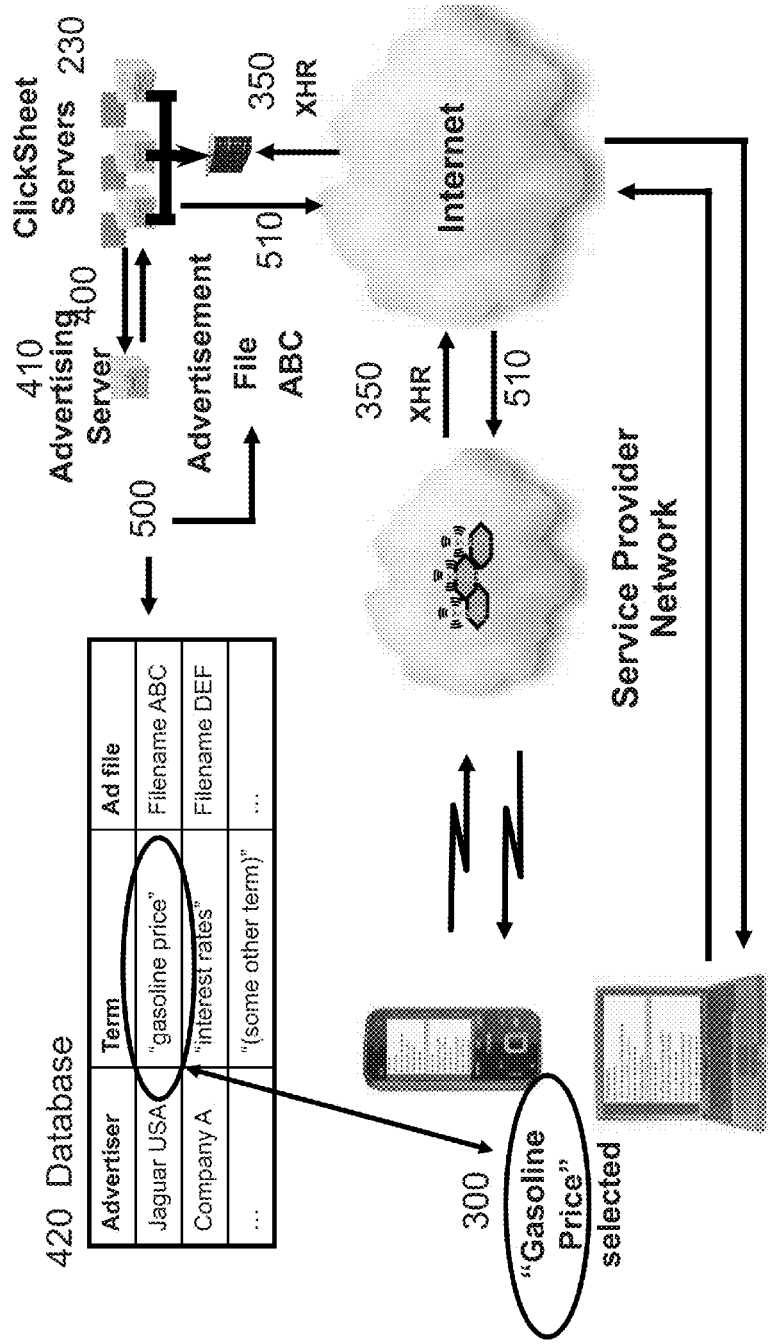
FIG. 5 shows a diagram of the system for contextual ad selection and delivery.

FIG. 5 shows a system of contextual advertisement selection and delivery. The context term is sent to a remote server 230 which may process further the context term before sending appropriate data 400 to an advertising server 410. The advertising server queries its database 420 to select an appropriate advertisement file 500. The advertisement file is sent to the remote server, which delivers it to the display client application software 300 for further processing. This occurs while the user is viewing the selected component object.

Figure 6:
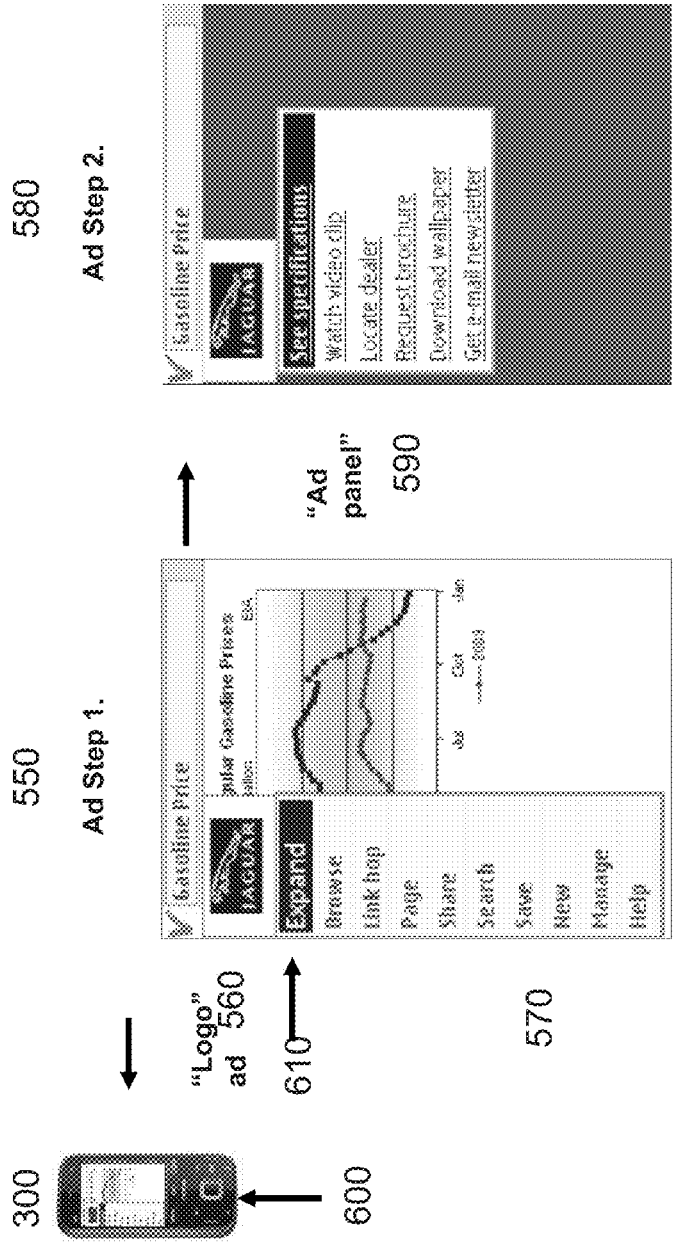
FIG. 6 shows screen shots of initial advertisement display and advertisement expansion.
Figure 7:
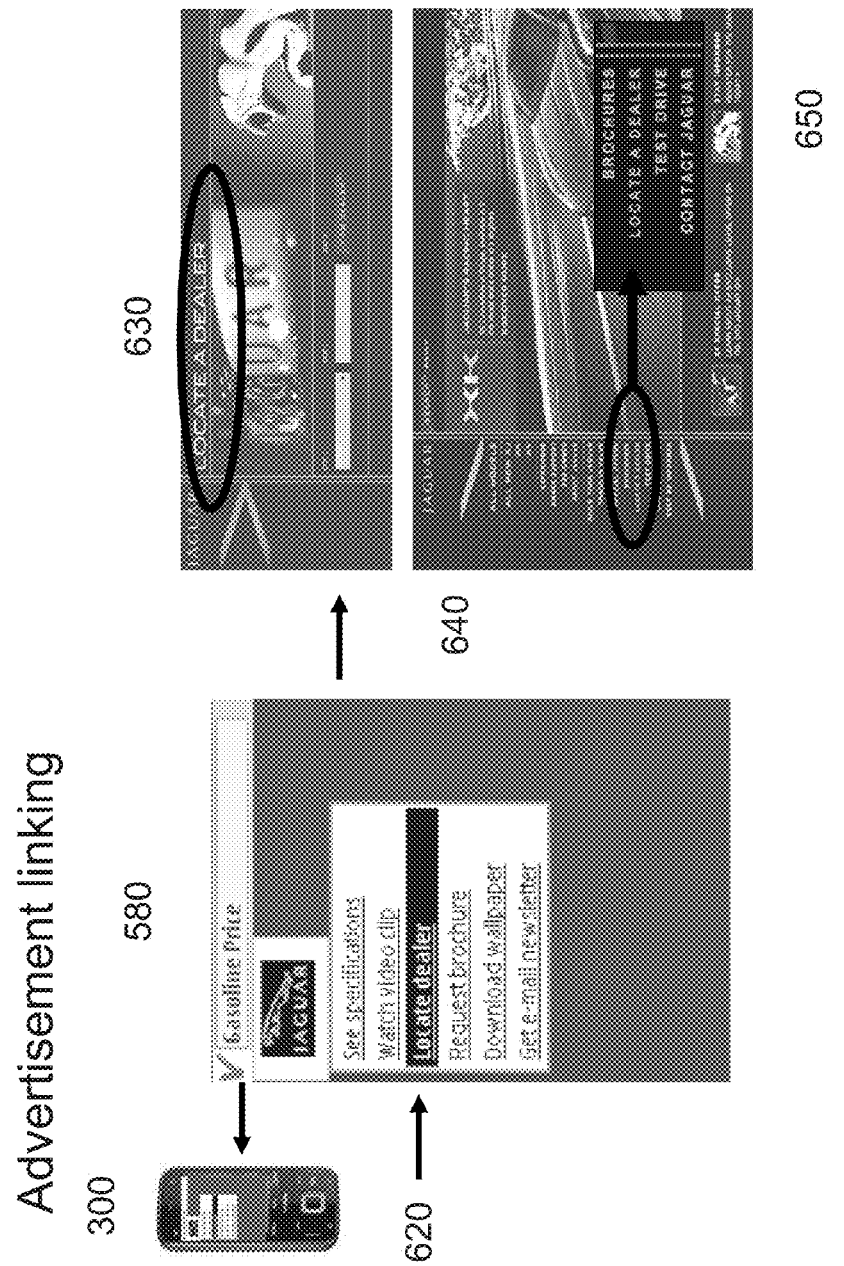
FIG. 7 shows screen shots of advertisement linking to an advertiser's landing page.

This embodiment reduces viewer resistance to mobile advertising by providing advertisements which are more contextually relevant because the context of a component object is more sharply defined than that of an entire web page. Contextually relevant advertisements may be displayed many different ways. This embodiment provides for an intermediary step which also reduces advertising intrusion. FIG. 6 shows a screen shot 550 of the display client application software at ad display step 1. It displays a "logo ad" 560 at the top of its menu 570 as specified by the advertisement file. The purpose of the logo ad is to attract interest based on name recognition. Other approaches, of course, may be used to attract interest. If the user does not recognize the advertiser name or otherwise has no interest, they can continue using the display client application software without any further intrusion. If the user wishes, one simple positive act of acceptance will result in the screen being taken over 580 by an "ad panel" with a selection of advertising "calls to action" 590. If the mobile device has a touch screen, the acceptance act may be touching the logo ad. If the mobile device has an arrow key interface, the acceptance act may be pressing the up arrow key 600 once when the top menu item 610 is highlighted. Once the ad panel is displayed, the user can navigate the choices it presents according to the user interface capabilities of the mobile device. To reduce further the intrusion of the ad panel display if and when the user wishes to proceed, one simple dismissal act, again a touch or an arrow key press, will hide it and re-display the screen as before. FIG. 7 shows a screen shot 580 that illustrates that selecting a call to action 620 in the ad panel acts as a simple link to a landing page 630 that is specified in the advertisement file. That landing page may be a standard, full-size web page that is part of the advertiser's web site 640. Or it may be a specially prepared, mobile-sized, web page that has a special purpose.

Figure 8A:
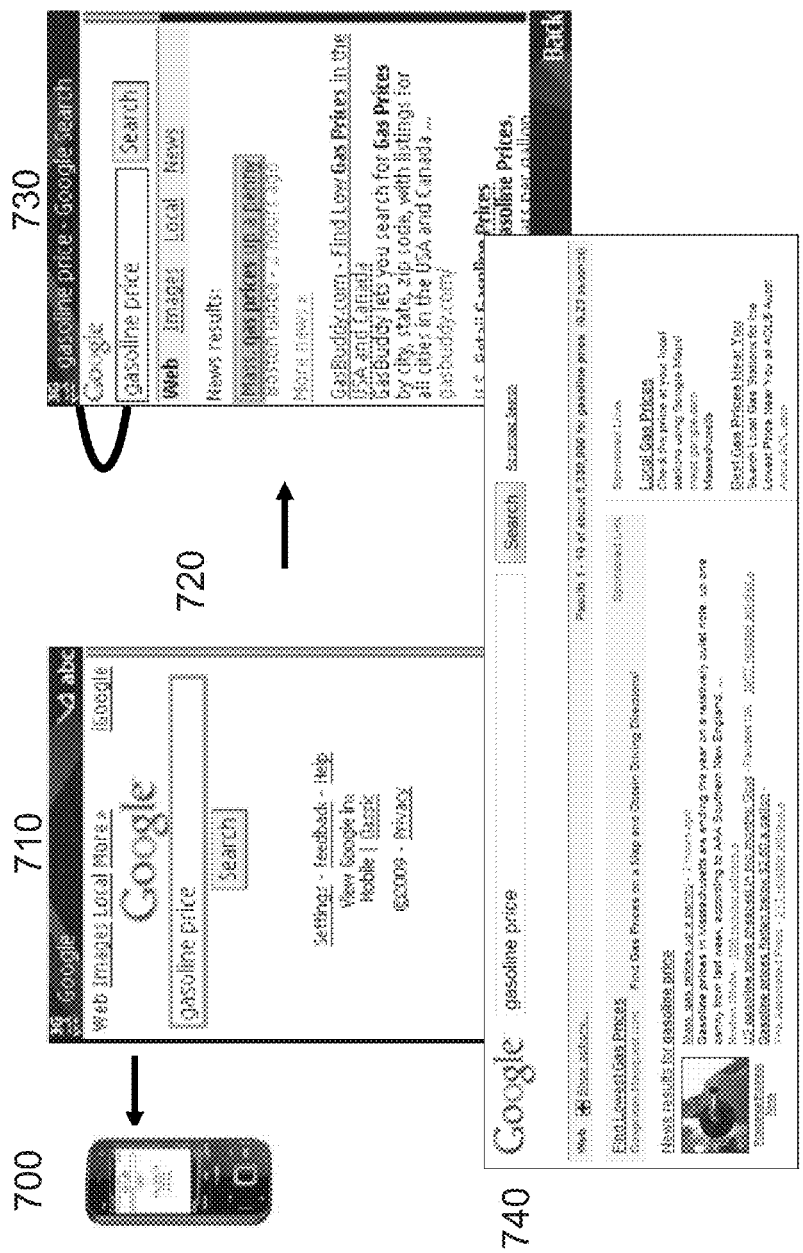
FIGS. 8A and 8B show screen shots of prior art performing non-branded and branded searches using a search engine.
Figure 8B:
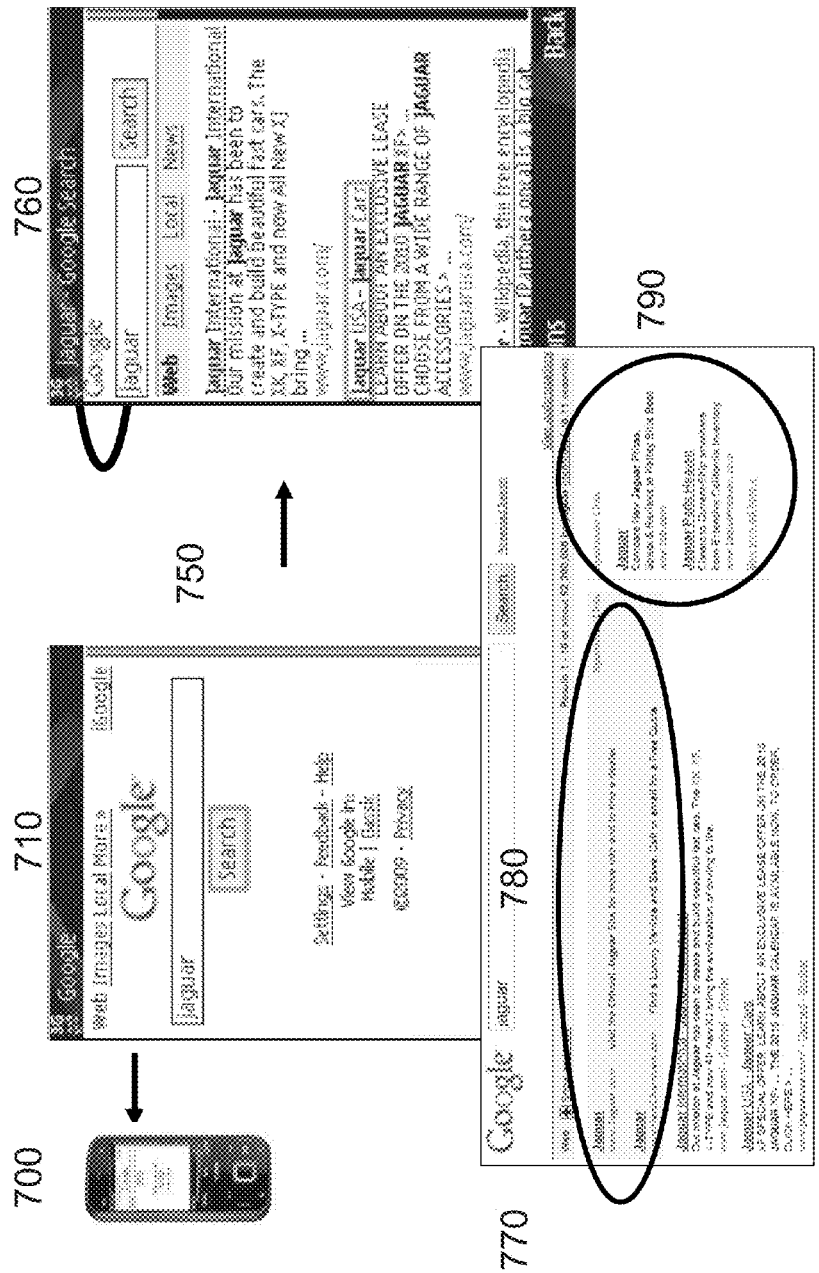

FIGS. 8A and 8B show screen shots of prior art whereby a PC or a mobile browser submits a search term to a search engine. FIG. 8A shows a screen shot of a mobile search page with the non-branded term "gasoline price" entered 710. When the search term is submitted to the search engine 720, a mobile Search Engine Results Page (SERP) 730 is returned. If a PC is used, the SERP 740 is shown. FIG. 8B shows a comparable branded search for the term "jaguar". The online SERP displays "sponsored link advertisements" 780 and 790 which are inserted by the search engine based on the context implied by the search term. Any page link returned in an SERP, whether using a mobile or PC client, is determined by search engine algorithms that attempt to determine the relevance of the page to the search term.

In contrast to the prior art, embodiments described herein recognize that the name given to a specific component object of a page, whether by the displayer or any other human or automatically applied, is likely to be more specific than the derived relevance ranking for an entire web page.

The method of storing data for future access to a selected component of a source digital document may include collecting component identification data sufficient for future location and identification of the selected component as well as combining said component identification data, presentation attributes data, and user-provided data in a combined identification data form for storage and future retrieval It is also understood that a user may apply a name and at least one other descriptive presentation attribute, or such presentation attributes as are dynamically generated from attributes of the component, to the component identification data.

The combined identification data of multiple components can be stored for future access in a group or as a unified document.

At least one or both of a document object structure or rendering capabilities of the component of the source document can be obtained by running a web browser, or running runtime code of a web browser, on a mobile client device, a desktop computer or other non-mobile device, or on a server.

It is also understood that the combined identification data of a specified component of the source digital document may be transferred to a second device, that is not the same as the originating device that was used to originally identify the selected component.

The combined identification data can be arranged in a message capable of display by application software; specifying an address and other transmission data for a message transmission method to be utilized; appending other user-created data to the message; and transferring said data directly to a specified destination address or indirectly through a server using a message transmission protocol.

Selecting the component may involve: displaying the source digital document for user interaction; visually marking a component of the source digital document that qualifies for said persistent storage; displaying a pictorial representation of the component relative to a screen size of a proposed device for display of the component in advance of its selection; enabling selection of a qualifying component; and displaying the selected qualifying component using associated code for the component.

The method of locating a previously selected component of a digital source document can also comprise: retrieving previously stored combined identification data for such specified component; retrieving at least the fewest possible components of the digital source document as practicable to display the selected component; identifying the selected component within its corresponding digital source document; dynamically determining and collecting source code from the digital source document that defines said selected component; and dynamically determining at least one of a style and/or other attributes of the selected component that define a presentation of said component.

At least one of a document object structure or rendering capability of a web browser, or the runtime code of a web browser can be utilized on a mobile client device, a desktop computer or other non-mobile device, or on a server to carry out one or more of the method steps.

A user context can be detected from viewing a specified component of a source digital document, by detecting textual attributes, including at least a name for and other said user-provided data of such component; determining other component identification data and presentation attributes data; and determining that said presentation attributes indicate a contextual intent of the user similar to entering of a search term by the user to a search engine.

While the above has now particularly shown and described example embodiments of the invention, it will be understood by those skilled in the art that various changes in form and details may be made therein without departing from the scope of the invention as encompassed only by the appended Claims.

What is claimed is:

1. A method for locating and displaying a previously selected component object of a digital source document comprising:

locating component identification data for the selected component object;
downloading source code for the selected component object from the digital source document;
individually displaying only the selected component object using the component identification data and the source code;
wherein the component object was determined to be the previously selected component object by the prior steps of:
receiving a request for downloading the digital source document including its related source code;
interactively displaying the digital source document for user interaction;
visually indicating to a user of those components of the digital source document that qualify for individual display;
receiving indication of a user selection of an element of the components of the digital source document that qualify for individual display at a later time as a selected component object;
collecting attributes that make up the component identification data for the selected component object; and
wherein the component identification data contains information used by the individually displaying step to locate the selected component object in the digital source document at the later time so that the selected component object as selected by the user can be redisplayed at the later time with updated contents as may be provided by updated source code for the digital source document.

2. The method of claim 1 wherein the step of individually displaying the selected component further comprises:
dynamically determining and collecting source code from the digital source document that defines the selected component object; and
dynamically determining at least one of a style and/or other presentation attributes of the selected component object that define a presentation of said selected component.

3. The method of claim 2 further comprising:
repeating application of said method for one or more additional components of the same source document, or for a different source document.

4. The method of claim 1, wherein a document object structure for the digital source document is utilized by runtime code of a web browser on a mobile client device, a laptop computer, a personal computer or other non-mobile device, or on a server to carry out one or more of the method steps.

5. The method of claim 1, wherein the selected component object of the digital source document is downloaded before a user selects it based on at least one of a. a location of a display device intended for display of the selected component object; b. a likelihood that a viewer will select the selected component object component based on past actions; or c. a contextual relevance of the selected component object.

6. The method of claim 1, wherein the selected component object of the digital source document is modified, or content is added to it, based on a location of a display device or other attributes of a user's context.

7. The method of claim 1 wherein the step of individually displaying further comprises:
loading the digital source document into a memory; determining a structure of the digital source document from a document object model; identifying at least one component as a qualifying selected component object of the digital source document that qualifies for generation of said combined identification data; transferring the combined identification data to persistent storage; dynamically determining source code that defines the selected component object; and dynamically determining at least one of a style and/or another attribute that defines a presentation of the selected component object.

8. The method of claim 1 wherein collecting attributes that make up the component identification data further comprises:
   retrieving the combined identification data of the selected component object; and
   transferring such combined identification data to persistent storage.

9. The method of claim 1 wherein receiving identification further comprises:
   providing a visual marking of a component of the digital source document that qualifies for individual display;
   optionally displaying a pictorial representation of the component relative to a screen size of a proposed device for display of the component at the later time; and
   enabling user selection of a qualifying component as the selected component object.

10. The method of claim 1, wherein a document object model is obtained by running a web browser, or running runtime code of a web browser, on a mobile client device, a laptop computer, a desktop computer or other non-mobile device, or on a server, and the document object model is used to generate the component identification data.

11. The method of claim 1, wherein a user provided name and at least one other presentation attribute are appended to the combined identification data.

12. The method of claim 1, wherein collecting attributes that make up the component identification data obtained by the further steps of:
   determining presentation attributes related to the selected component object;
   receiving user-provided data related to the selected component object;
   combining said component identification data, presentation attributes data, and user-provided data as the combined identification data; and
   transferring such combined identification data to persistent storage.

13. The method of claim 1 wherein the combined identification data is stored as a file or a database entry in persistent storage.

14. The method of claim 13 wherein the persistent storage is located on an originating device that is used to identify the selected component object.

15. The method of claim 14, wherein the combined identification data of the selected component object of the digital source document is transferred to a second device that is not the same as the originating device that is used to identify the selected component object, and the step of locating the combined identification data further comprises:
   specifying an address and other transmission data for a message transmission method to be utilized; and
   forwarding, through a server using a transmission protocol, the combined identification data as a communication message to the second device.

16. The method of claim 13 wherein the persistent storage is located on a remote device that is different from, and available for access by, the originating device or by other devices.

17. The method of claim 1, wherein said combined identification data of multiple selected component objects is stored for access at a later time in a group of selected component objects.

18. The method of claim 1, wherein the source code that defines the selected component object and a style and/or other presentation attributes data that define a presentation of the selected component are transferred to a second device that is not the same as the originating device that is used to identify the selected component object, and the step of individually displaying further comprises:
   arranging the source code, styles, and/or attributes data in a message of a standard format appropriate for display by application software that is not otherwise capable of interpreting the combined identification data;
   specifying an address and other transmission data appropriate for a transmission method to be utilized for transmitting the message; and
   appending other data, including but not limited to the forms of text, audio, video, or images that may be user-created or programmatically generated, to the message; and
   transferring said message directly to a specified destination address or indirectly is through a server.

19. The method of claim 1, further comprising:
   detecting a user context as a result of interactively displaying the digital document by:
   detecting textual attributes, including at least a user-provided name for and other said user-provided or programmatically generated data for such selected component object.

20. The method of claim 19, further comprising:
   selecting advertising content based on the user context, including at least the user-provided name;
   delivering advertising content to a client device on which the step of individually displaying is carried out, the advertising content delivered in a reduced size compatible with a client application software for the client device;
   displaying such advertising content when the user is performing procedures where such display is less intrusive;
   monitoring a pre-defined action that signifies a user interest in the advertising content;
   rendering a larger display of advertising content upon detection of such user interest; and
   monitoring a pre-defined action that signifies user desire to discontinue the larger advertising content display and, when detected, to extinguish the larger display.

21. The method of claim 20, wherein an advertising content display includes one or more link elements which, when selected by the user, cause the display of other digital documents.

22. The method of claim 20, wherein at least one of a document object structure or runtime code of a web browser are utilized on a mobile device, a laptop computer, a desktop computer or other non-mobile client device, or a server to carry out one or more of the method steps.

* * * * *